(12) United States Patent
Takanohashi (10) Patent No.: US 9,360,386 B2
(45) Date of Patent: Jun. 7, 2016

(54) AMPLIFIER-EMBEDDED PRESSURE SENSOR (71) Applicant: SURPASS INDUSTRY CO., LTD., Saitama (JP)

(72) Inventor: Toshiyuki Takanohashi, Saitama (JP)

(73) Assignee: SURPASS INDUSTRY CO., LTD., Gyoda-Shi, Saitama (JP)

(*) Notice: Subject to any disclaimer, the term of this patent is extended or adjusted under 35 U.S.C. 154(b) by 134 days.

(21) Appl. No.: 14/090,255

(22) Filed: Nov. 26, 2013

(65) Prior Publication Data
US 2014/0165734 A1 Jun. 19, 2014

(30) Foreign Application Priority Data

Dec. 13, 2012 (JP) .................................. 2012-272376

(51) Int. Cl.
| G01F 1/36 | (2006.01) |
| G01L 9/00 | (2006.01) |
| G01L 19/00 | (2006.01) |
| G01L 19/06 | (2006.01) |

(52) U.S. Cl.
CPC ................ G01L 9/0041 (2013.01); G01F 1/36 (2013.01); G01F 1/363 (2013.01); G01L 19/0038 (2013.01); G01L 19/0681 (2013.01)

(58) Field of Classification Search
CPC .. G01L 13/025; G01L 9/0022; G01L 19/0645
USPC ..................................... 73/717, 716, 715, 700
See application file for complete search history.

(56) References Cited

U.S. PATENT DOCUMENTS

| 6,901,803 B2* | 6/2005 | Fandrey ........................... 73/706 |
| 7,891,256 B2* | 2/2011 | Ushigusa et al. .......... 73/861.61 |
| 7,920,382 B2* | 4/2011 | Uluc et al. ..................... 361/696 |

FOREIGN PATENT DOCUMENTS

| JP | H08-121308 A | 5/1996 |
| JP | 2000-249614 A | 9/2000 |
| JP | 2007-064823 A | 3/2007 |
| JP | 2007-078383 | 3/2007 |
| JP | 2007-155500 A | 6/2007 |

OTHER PUBLICATIONS

Office Action issued in Japanese Counterpart Patent Appl. No. 2012-272376, dated Apr. 26, 2016.

* cited by examiner

Primary Examiner — Lisa Caputo
Assistant Examiner — Nathaniel T Woodward
(74) Attorney, Agent, or Firm — Greenblum & Bernstein, P.L.C.

(57) ABSTRACT

An amplifier-embedded pressure sensor includes: a pressure-detecting element which detects the differential pressure between the fluid and the space where the pipe including a fluid passage of the fluid is installed, and outputs the pressure signal; an amplifier circuit board having an amplifier circuit for amplifying the pressure signal; a housing to which the pressure-detecting element is fixed; and a separation part which is fixed to the housing and separates a space inside the housing into a first space where the pressure-detecting element is disposed and a second space where the amplifier circuit board is disposed. The housing includes an inflow port for letting cooling gas for cooling the amplifier circuit board flow into the second space and a discharge port for discharging the cooling gas from the second space.

8 Claims, 6 Drawing Sheets

AMPLIFIER-EMBEDDED PRESSURE SENSOR

TECHNICAL FIELD

The present invention relates to an amplifier-embedded pressure sensor.

BACKGROUND ART

Conventionally, a pressure sensor is used to detect pressure of a fluid flowing through a passage. Known pressure sensors include an amplifier-embedded type which has an embedded amplifier circuit for amplifying a pressure signal detected by a pressure-detecting unit (e.g., see PTL 1), and a separate type which has no embedded amplifier circuit, but instead transmits a pressure signal to an amplifier circuit provided outside the pressure sensor.

Due to a short length of its wire for transmitting a pressure signal, which is a minute signal, to the amplifier circuit, the amplifier-embedded pressure sensor has an advantage that the pressure signal is less likely to be affected by noise, etc.

CITATION LIST

Patent Literature

{PTL 1}
Japanese Unexamined Patent Application, Publication No. 2007-78383

SUMMARY OF INVENTION

Technical Problem

Since the amplifier circuit is disposed at a position close to the pressure-detecting unit in the amplifier-embedded pressure sensor, when a fluid to be detected is at a high temperature (e.g., temperatures of 80° C. or higher and 200° C. or lower), heat is transferred to the amplifier circuit, which may adversely affect the operation of the amplifier circuit.

The present invention has been made in view of the above circumstances, and an object thereof is to provide an amplifier-embedded pressure sensor which, when detecting a differential pressure between a high-temperature fluid and a space where a pipe including a fluid passage of the fluid is installed, can properly detect the differential pressure between the fluid and the space where the pipe is installed, while protecting an amplifier circuit for amplifying a pressure signal from heat of the fluid.

Solution to Problem

In order to solve the above problem, the present invention has adopted the following solutions.

According to the present invention, there is provided an amplifier-embedded pressure sensor, which is connected to a pipe having a fluid passage, including: a pressure-detecting unit which has a pressure-receiving surface in contact with a fluid flowing in from the pipe, and which detects a differential pressure between the fluid in contact with the pressure-receiving surface and a space where the pipe is installed and outputs a pressure signal; an amplifier circuit board which has an amplifier circuit for amplifying the pressure signal detected by the pressure-detecting unit; a housing to which the pressure-detecting unit is fixed; and a separation part which is fixed to the housing and separates a space inside the housing into a first space where the pressure-detecting unit is disposed and a second space where the amplifier circuit board is disposed. The housing includes an inflow port for letting cooling gas for cooling the amplifier circuit board flow into the second space and a discharge port for discharging the cooling gas from the second space.

In the amplifier-embedded pressure sensor according to the present invention, the space inside the housing, to which the pressure-detecting unit is fixed, is separated by the separation part into the first space where the pressure-detecting unit is disposed and the second space where the amplifier circuit board having the amplifier circuit for amplifying the pressure signal detected by the pressure-detecting unit is disposed. The amplifier circuit board is cooled by the cooling gas flowing from the inflow port into the second space of the housing, and the cooling gas is discharged from the discharge port to the outside of the housing. Although inflow of the cooling gas causes pressure fluctuations in the second space inside the housing, no pressure fluctuation occurs in the first space, as the first space is separated from the second space by the separation part. Therefore, pressure fluctuation in the second space does not affect the detection results of the pressure-detecting unit which detects the differential pressure between the fluid to be detected and the space where the pipe is installed.

Thus, according to the present invention, it is possible to provide an amplifier-embedded pressure sensor which, when detecting the differential pressure between the high-temperature fluid and the space where the pipe including the fluid passage is installed, can properly detect the differential pressure between the fluid and the space where the pipe is installed, while protecting an amplifier circuit for pressure signals from heat of the fluid.

According to a first aspect of the amplifier-embedded pressure sensor of the present invention, the amplifier circuit board is disposed between the inflow port and the discharge port.

This allows the cooling gas to flow near both front and back surfaces of the amplifier circuit board, so that the amplifier circuit is adequately cooled.

According to a second aspect of the amplifier-embedded pressure sensor of the present invention, the separation part includes: a separation board which has an outer circumferential surface of a shape substantially matching a shape of an inner circumferential surface of the housing; and a filling material which is packed between the outer circumferential surface of the separation board and the inner circumferential surface of the housing so as not to allow the cooling gas to pass through.

According to the second aspect of the amplifier-embedded pressure sensor of the present invention, the space between the inner circumferential surface of the housing and the outer circumferential surface of the separation board, whose shape substantially matches the shape of the inner circumferential surface of the housing, is filled with the filling material, so that the cooling gas is prevented from flowing from the second space into the first space.

This allows the space inside the housing to be separated into the first space where the pressure-detecting unit is disposed and the second space where the amplifier circuit board is disposed, by a relatively simple work of packing the filling material between the outer circumferential surface of the separation board and the inner circumferential surface of the housing.

According to a third aspect of the amplifier-embedded pressure sensor of the present invention, the amplifier-embedded pressure sensor may include a coupling part to which an external wire for transmitting the pressure signal amplified by the amplifier circuit to an external device is coupled, and the first space may communicate with a space near the external device through a third space between the external wire and a cladding part cladding the external wire.

This allows gas in the space near the external device, which is disposed at a position separated from the pressure sensor by a length of the external wire, to be supplied to the first space through the third space. Thus, corrosion of the pressure-detecting unit in the first space can be prevented, as the space near the pressure sensor may corrode the pressure-detecting unit in the first space due to effects of a fluid, etc. whose pressure is to be detected.

According to a fourth aspect of the amplifier-embedded pressure sensor of the present invention, a fluid chamber is formed by the pressure-receiving surface of the pressure-detecting unit and a surface of the housing opposite to the pressure-receiving surface, and the housing includes a first passage which communicates with an external passage and a second passage which communicates the first passage and the fluid chamber, and a passage diameter of the second passage is smaller than a passage diameter of the first passage.

This allows the temperature of the fluid reaching the fluid chamber to be kept low by sufficiently cooling the high-temperature fluid flowing in from the first passage in the second passage, which has higher cooling efficiency than the first passage, before the fluid reaches the fluid chamber.

In the fourth aspect of the amplifier-embedded pressure sensor of the present invention, a passage length of the second passage may be longer than a passage length of the first passage.

This allows the cooling efficiency of the second passage to be further enhanced, so that the temperature of the fluid reaching the fluid chamber can be kept sufficiently low.

In the fourth aspect of the amplifier-embedded pressure sensor of the present invention, a diameter of an outer circumferential surface of the second passage may be smaller than a diameter of an outer circumferential surface of the first passage, and a support member may be provided which is disposed so as to surround the second passage over its passage length, and supports the second passage in a state where the space close to the outer circumferential surface of the second passage communicates with an external space.

This allows the effects of load on the second passage having a smaller passage diameter to be properly supported by the support member, so that deformation of the second passage can be adequately prevented.

According to a fifth aspect of the amplifier-embedded pressure sensor of the present invention, an opening diameter of the discharge port to the second space is larger than an opening diameter of the inflow port to the second space.

This allows the cooling gas flowing from the inflow port into the second space of the housing to be easily discharged from the discharge port, so that a failure due to high pressure in the second space can be prevented.

According to a sixth aspect of the amplifier-embedded pressure sensor of the present invention, the amplifier-embedded pressure sensor includes: a first wire for transmitting the pressure signal from the pressure-detecting unit to the separation part; a second wire for transmitting the pressure signal from the separation part to the amplifier circuit board; and a third wire for transmitting the pressure signal amplified by the amplifier circuit from the amplifier circuit board to the separation part, and the separation part includes a first terminal, to which the first wire is connected, on a first space-side surface thereof, and a second terminal, to which the second wire is connected, on a second space-side surface thereof, and the first terminal and the second terminal are electrically connected with each other.

This allows transmission of the pressure signal from the pressure-detecting unit to the amplifier circuit and transmission of the amplified pressure signal from the amplifier circuit to the separation part while separating the first space and the second space by the separation part.

Advantageous Effects of Invention

According to the present invention, it is possible to provide an amplifier-embedded pressure sensor which, when detecting a differential pressure between a high-temperature fluid and a space where a pipe including a fluid passage of the fluid is installed, can properly detect the differential pressure between the fluid and the space where the pipe is installed, while protecting an amplifier circuit for pressure signals from heat of the fluid.

BRIEF DESCRIPTION OF DRAWINGS

FIG. 4 is a transverse cross-sectional view of the pressure sensor shown in FIG. 2, in which FIG. 4(a) is a transverse cross-sectional view along the line C-C, FIG. 4(b) is a transverse cross-sectional view along the line D-D, and FIG. 4(c) is a transverse cross-sectional view along the line E-E.

DESCRIPTION OF EMBODIMENTS

First Embodiment

Figure 1:
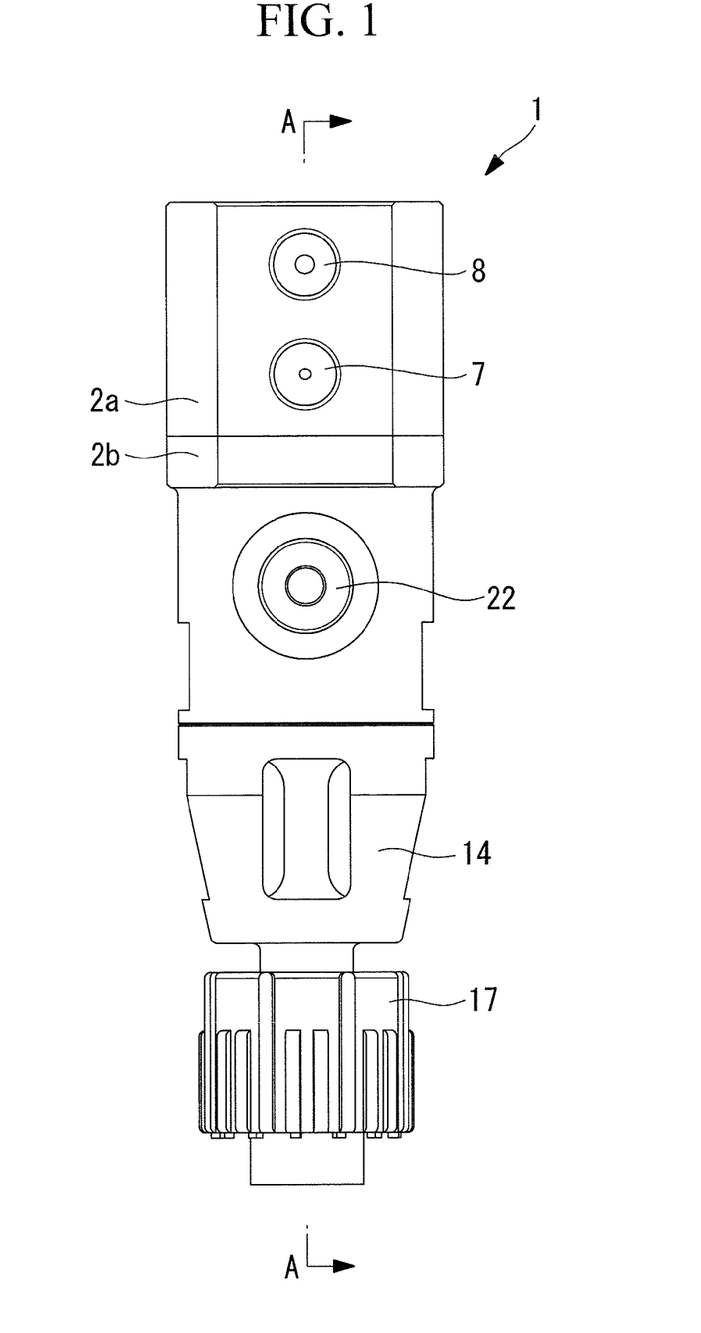
FIG. 1 is a front view showing a pressure sensor of a first embodiment of the present invention.
Figure 2:
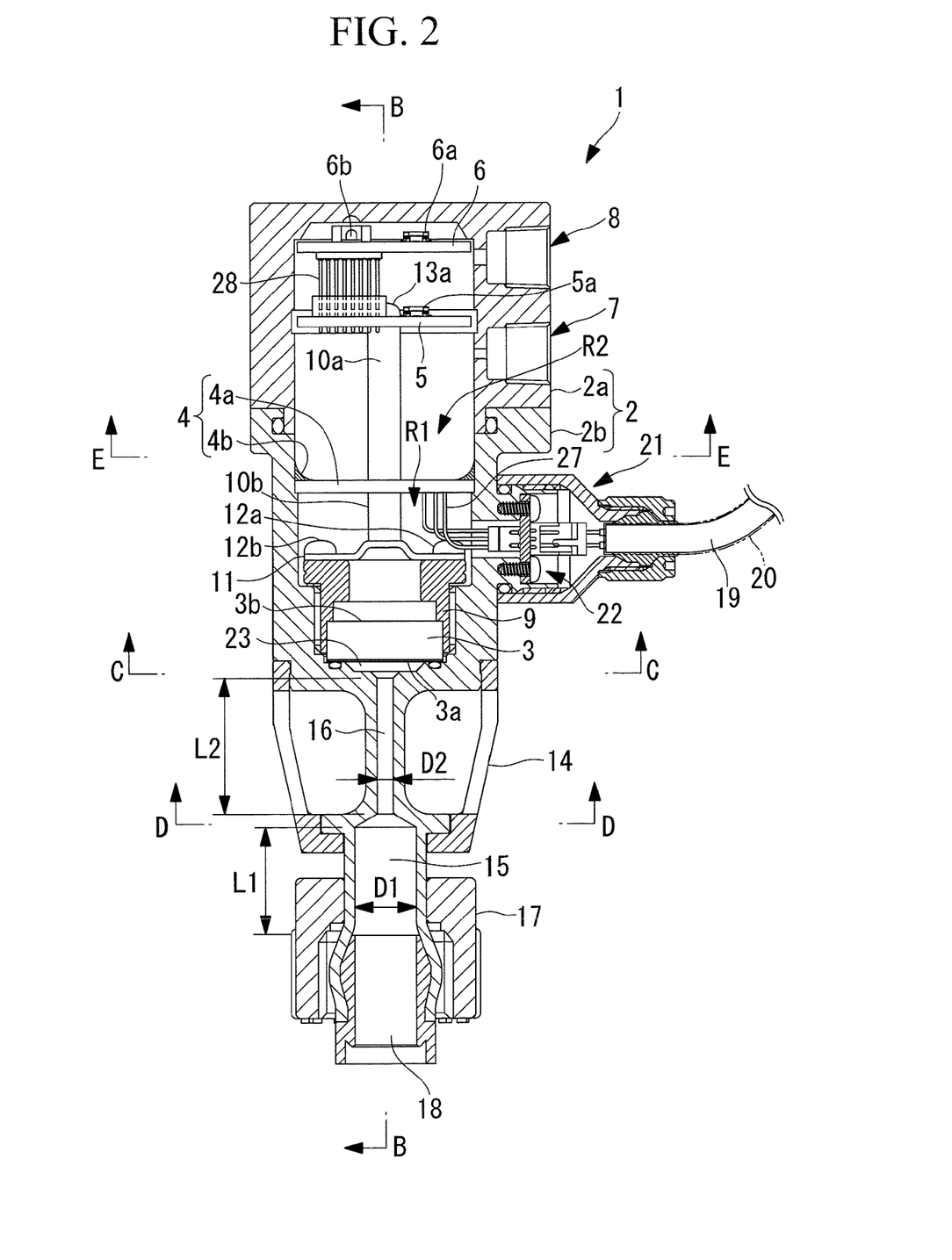
FIG. 2 is a cross-sectional view showing an internal structure of the pressure sensor shown in FIG. 1 along the line A-A.
Figure 3:
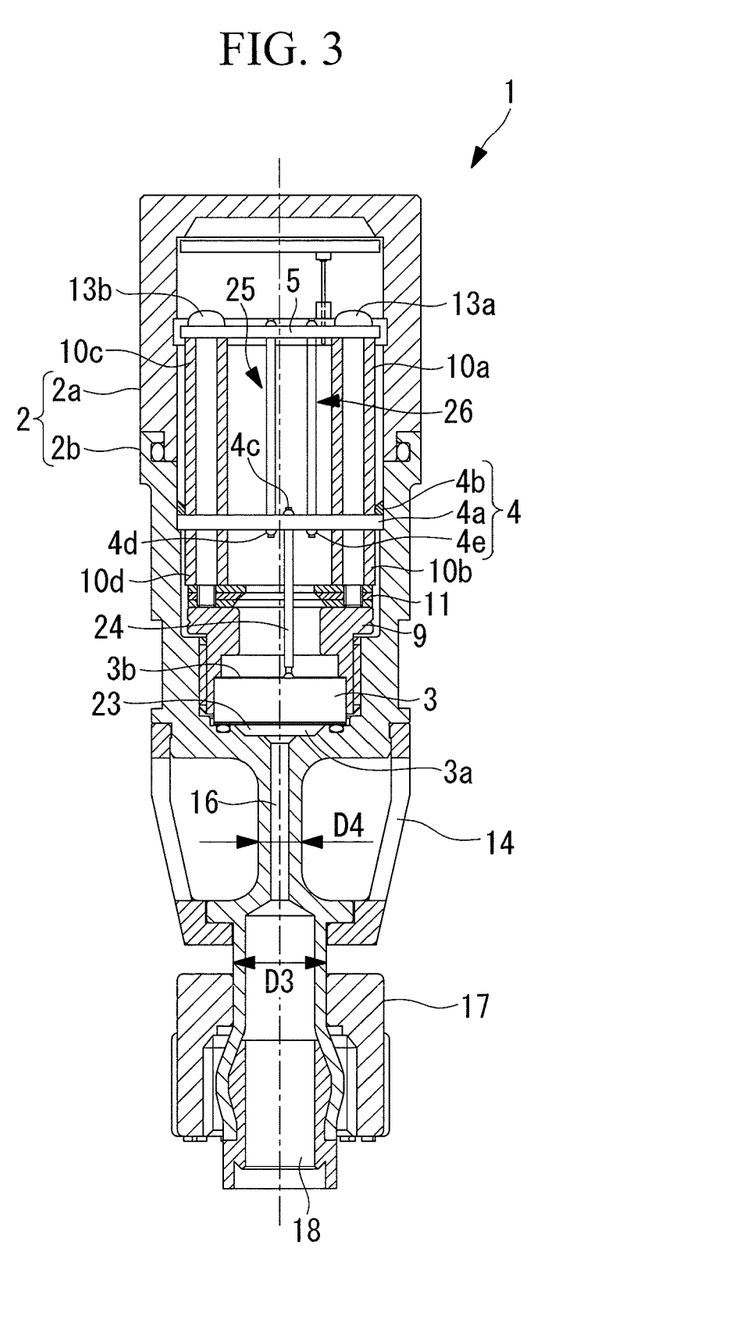
FIG. 3 is a cross-sectional view showing the internal structure of the pressure sensor shown in FIG. 2 along the line B-B.

Hereinafter, an amplifier-embedded pressure sensor of a first embodiment of the present invention will be described based on the drawings. FIG. 1 is a front view of the amplifier-embedded pressure sensor of the first embodiment. FIG. 2 is a cross-sectional view showing an internal structure of a pressure sensor 1 shown in FIG. 1 along the line A-A. FIG. 3 is a cross-sectional view showing the internal structure of the pressure sensor shown in FIG. 2 along the line B-B.

As shown in FIGS. 1 to 3, the pressure sensor 1 is a sensor in which a pressure-detecting element 3 (pressure-detecting unit) is fixed inside a housing 2 which is constituted of a housing cover 2a and a housing body 2b.

Figure 5:
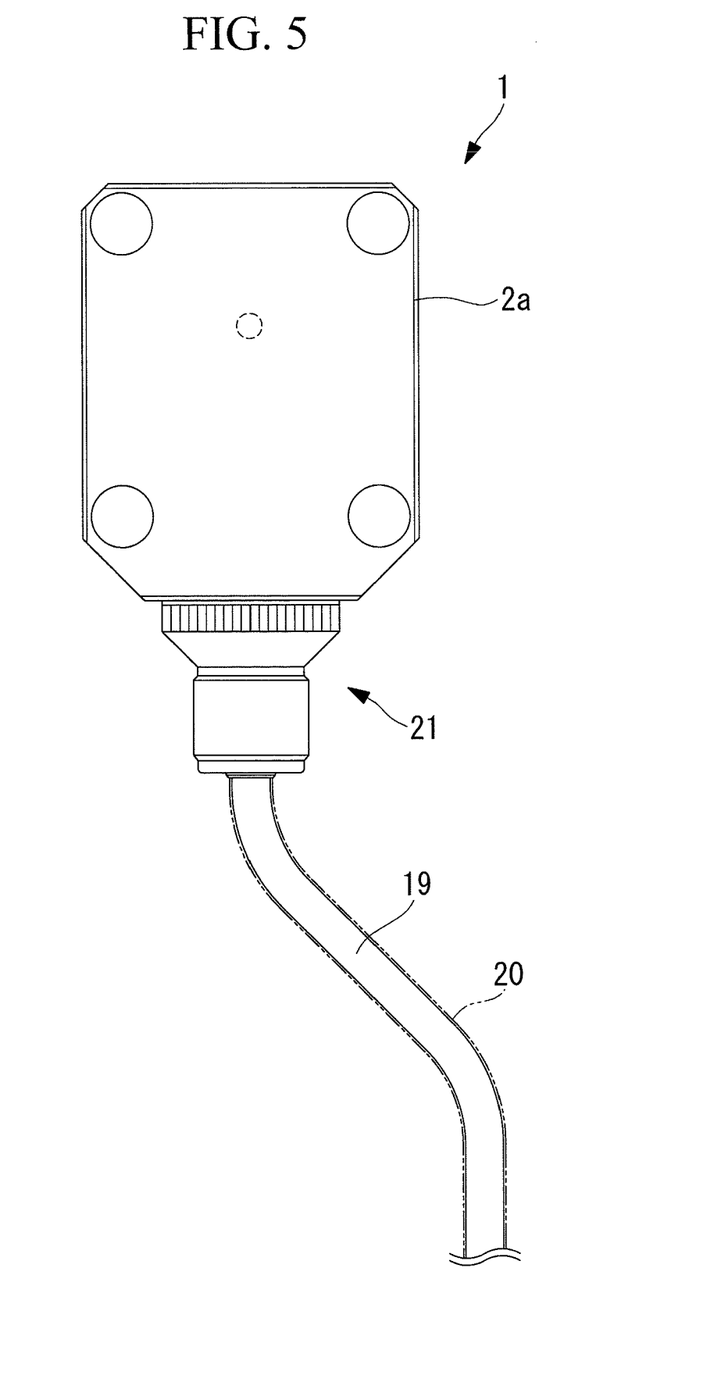
FIG. 5 is a top view of the pressure sensor shown in FIG. 1.

FIG. 5 is a top view of the pressure sensor shown in FIG. 1. As shown in FIG. 5, the pressure sensor 1 can transmit a pressure signal to an external device through an external wire 19 which is clad with a cladding film 20. The external wire 19 is coupled to the pressure sensor 1 through a connection part 21 to be described later.

The pressure sensor 1 is a sensor which is connected to a pipe (not shown) including a fluid passage, and detects a differential pressure between pressure of a fluid flowing in from the pipe and pressure of a space where the pipe is installed, and outputs a pressure signal.

The pressure sensor 1 includes a pressure-receiving surface 3a which contacts with the fluid and detects the differential pressure between the fluid and the space where the pipe is installed. A fluid chamber 23 is formed by the pressure-receiving surface 3a of the pressure sensor 1 and a surface of the housing body 2b opposite to the pressure-receiving surface 3a. The fluid whose pressure is to be detected by the pressure sensor 1 flows in from a first passage 15 communicating with an external passage 18, and flows into the fluid chamber 23 via a second passage 16 which couples the first passage 15 and the fluid chamber 23. The housing body 2b of the pressure sensor 1 and the external passage 18 are fastened by a cap nut 17.

As shown in FIG. 2, a passage diameter D2 of the second passage 16 is smaller than a passage diameter D1 of the first passage 15. In addition, a passage length L2 of the second passage 16 is longer than a passage length L1 of the first passage 15. Here, the passage length L1 of the first passage 15 denotes a length of a portion of the housing body 2b whose passage diameter is D1 and whose inner surface is in contact with the fluid. On the other hand, the passage length L2 of the second passage 16 denotes a length of a portion of the housing body 2b whose passage diameter is D2 and whose inner surface is in contact with the fluid.

The pressure sensor 1 of the present embodiment is designed to suitably detect pressure of a fluid at a high temperature (e.g., temperatures of 80° C. or higher and 200° C. or lower). More specifically, the passage diameter D2 of the second passage 16 is smaller than the passage diameter D1 of the first passage 15, and the passage length L2 of the second passage 16 is longer than the passage length L1 of the first passage 15, so that the fluid flowing from the external passage 18 into the fluid chamber 23 is cooled while passing through the second passage 16. The passage diameter D1 can be, e.g., 9.5 mm, while the passage diameter D2 can be, e.g., 2.5 mm.

The pressure-detecting element 3 is an element which detects a difference (differential pressure) between the pressure of the fluid in contact with the pressure-receiving surface 3a and the pressure in the space where the pipe including the fluid passage is installed, and outputs a pressure signal. In the present embodiment, an air intake port (not shown) communicating with a first space R1 is provided in a back surface 3b of the pressure-detecting element 3, and the pressure in the first space R1 serves as a reference pressure. Although in the present embodiment, the pressure inside the first space R1 is assumed to be the atmospheric pressure, the present invention may have another aspect in this respect. For example, pressure in a chamber filled with gas other than air may serve as the reference pressure. In this case, various gases can be adopted as long as the gas does not affect the operation of the pressure sensor 1.

The pressure-detecting element 3 is a columnar member having a substantially circular shape in plan view. An outer circumferential surface of the pressure-detecting element 3 and an outer edge of the back surface 3b of the pressure-detecting element 3 are in contact with an inner surface of a sensor holding member 9 having an annular shape in cross-section. The sensor holding member 9 is a member which holds the pressure-detecting element 3 against the housing body 2b. The sensor holding member 9 has a male screw formed on the outer circumferential surface thereof, and is fastened by the male screw being engaged with a female screw formed on the inner circumferential surface of the housing body 2b.

A support base member 11 is disposed between screw heads of male screws 12a and 12b, and the sensor holding member 9, and fixed to the sensor holding member 9 by the male screws 12a and 12b.

The support base member 11 is a member which supports a spacers 10b and 10d for disposing a separation member 4 (separation part) and an amplifier circuit board 5 at a distance from the pressure sensor 1. As shown in FIGS. 2 and 3, the separation member 4 is disposed at a position away from the support base member 11 by spacers 10b and 10d. Similarly, the amplifier circuit board 5 is disposed at a position away from the separation member 4 by spacers 10a and 10c.

A male screw 13a is inserted into the amplifier circuit board 5, the spacer 10a, the separation member 4, and the spacer 10b in this order, and has a tip thereof fastened to a female screw provided in the support base member 11. The male screw 13b is inserted into the amplifier circuit board 5, the spacer 10c, the separation member 4, and the spacer 10d in this order, and has a tip thereof fastened to a female screw provided in the support base member 11. In this way, each of the separation member 4 and the amplifier circuit board 5 is disposed at the position away from the support base member 11.

The separation member 4 is constituted of a separation board 4a and a filling material 4b. The separation board 4a is a disk-like member of a material similar to that of a printed wiring board used for electronic circuits. The separation board 4a has an outer circumferential surface of a shape substantially matching the shape of the inner circumferential surface of the housing cover 2a.

The filling material 4b is provided at the outer edge of the second space-side surface of the separation board 4a so as not to allow cooling gas to pass through between the outer circumferential surface of the separation board 4a and the inner circumferential surface of the housing body 2b. The space inside the housing 2 is separated into the first space R1, where the pressure-detecting element 3 is disposed, and the second space R2, where the amplifier circuit board 5 is disposed, by the separation member 4 fixed to the housing body 2b.

Figure 4:
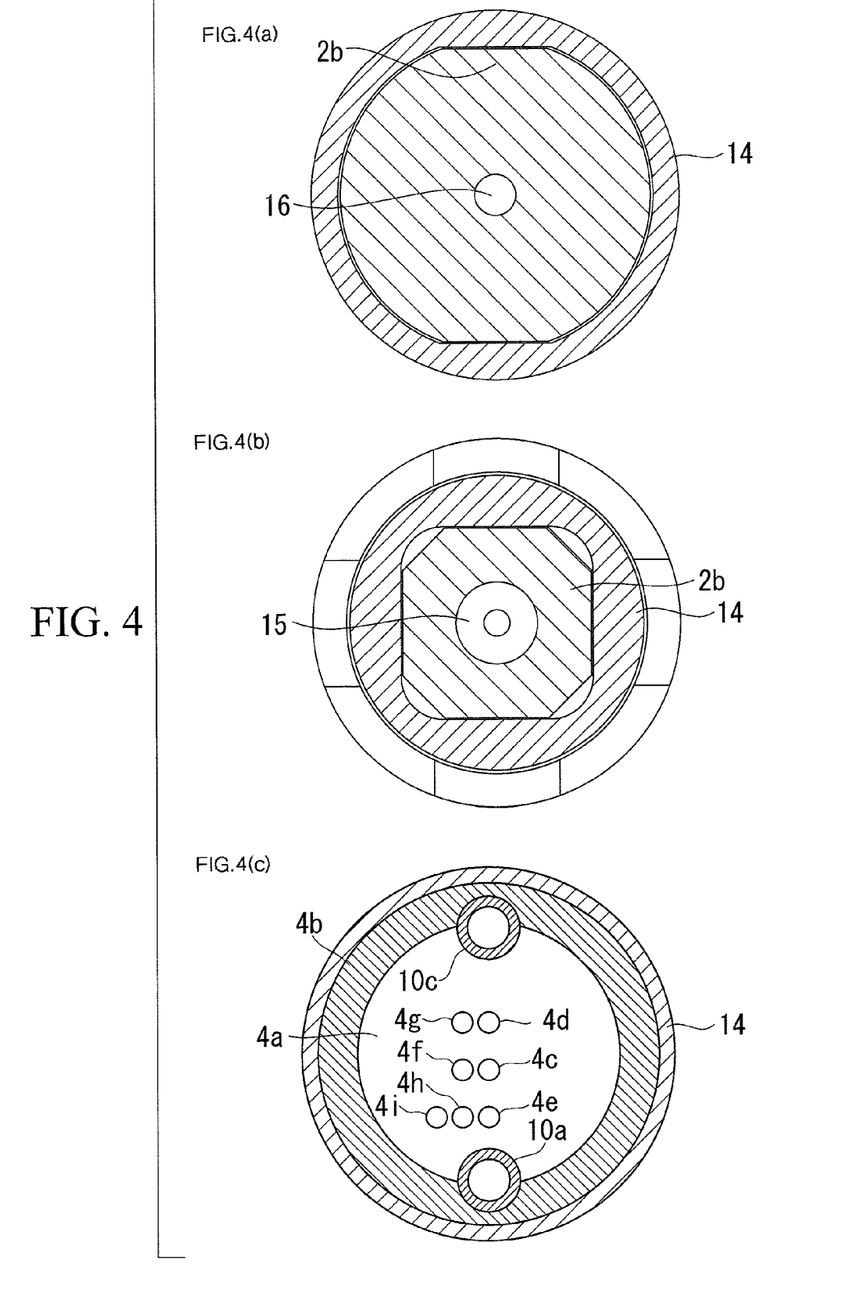

The filling material 4b is a resin containing a curing agent, which is applied in a state where the separation board 4a is disposed on the spacer 10, and cures after a certain period of time has elapsed. Among various types of resins which can be used, for example, a silicon resin or an epoxy resin can be used. As shown in FIG. 4(c), the filling material 4b is packed between the outer circumferential surface of the separation board 4a and the inner circumferential surface of the housing body 2b over the entire circumference of the outer edge of the separation board 4a so as to fill the space.

As shown in FIGS. 3 and 4(c), a terminal 4c, to which a pressure signal line of a first wire 24 which transmits the pressure signal output from the pressure-detecting element 3 is connected, is provided on a surface of the separation board 4a on the first space R1 side. Accordingly, the pressure signal output from the pressure-detecting element 3 is transmitted to the terminal 4c of the separation board 4a through the first wire 24. The first wire 24 includes the pressure signal line and a power line, and the power line is connected to a terminal 4f shown in FIG. 4(c). Power from the external device is supplied to the pressure-detecting element 3 through the terminal 4f.

The amplifier circuit board 5 is a board on which an amplifier circuit 5a is provided, and is a disk-like member of a material similar to that of a printed wiring board used for electronic circuits.

As shown in FIGS. 3 and 4(c), a terminal 4d, to which a second wire 25 which transmits the pressure signal from the separation board 4a to the amplifier circuit board 5 is connected, is provided on a surface of the separation board 4a on the second space R2 side. The terminal 4c and the terminal 4d are electrically connected with each other, and the pressure signal output from the terminal 4d of the separation board 4a is transmitted to the amplifier circuit board 5 through the pressure signal line included in the second wire 25.

The second wire 25 includes the pressure signal line and a power line. The pressure signal line is connected to the terminal 4d, while the power line is connected to a terminal 4g. The terminal 4g is electrically connected to the terminal 4f, so that power supplied through the terminal 4g is transmitted to the terminal 4f.

The terminal 4c, the terminal 4d, the terminal 4f, and the terminal 4g are formed using through-holes, and the terminals and the wires are electrically connected by being soldered in a state where an end of the wire is inserted in a through-hole. Since the through-hole is filled with solder in the soldered state, gas cannot flow between the first space R1 and the second space R2 via the through-hole.

The amplifier circuit 5a is a circuit which amplifies the pressure signal, which is a minute signal transmitted through the pressure signal line of the second wire 25. The pressure signal amplified by the amplifier circuit 5a (hereinafter referred to as an amplified signal) is transmitted to the separation board 4a through a pressure signal line of a third wire 26. The amplified signal transmitted to the separation board 4a is transmitted to the external wire 19 through a fourth wire 27.

The third wire 26 includes the pressure signal line, a power line, and a control signal line. The pressure signal line is connected to a terminal 4e of the separation board 4a, the power line is connected to a terminal 4h, and the control signal line is connected to a terminal 4i. The terminal 4e of the separation board 4a is electrically connected with the pressure signal line included in the external wire 19, and the amplified signal input through the terminal 4e is transmitted to the external device through the external wire 19.

The external wire 19 includes a power line, and the power line of the external wire 19 is electrically connected to the terminal 4h of the separation board 4a. Power supplied from the external device is transmitted to the amplifier circuit board 5 through the terminal 4h.

The external wire 19 includes a control signal line, and the control signal line is electrically connected to the terminal 4i of the separation board 4a. A control signal input from the external device is transmitted to the amplifier circuit board 5 through the terminal 4i.

A zero-point adjustment signal for executing zero-point adjustment of the pressure-detecting element 3 is included among various types of signals which are input from the external device as the control signal. The zero-point adjustment refers to a process of adjusting the pressure signal output by the pressure-detecting element 3. When the zero-point adjustment signal is sent from the external device in a state where the pressure inside the fluid chamber 23 is equal to the pressure (atmospheric pressure in this embodiment) in the space where the fluid pipe is disposed, the amplifier circuit 5a performs a zero-point adjustment process. More specifically, the amplifier circuit 5a corrects the pressure signal input from the pressure-detecting element 3 so that the pressure signal upon reception of the zero-point adjustment signal from the external device becomes a value indicating the atmospheric pressure.

A display circuit board 6 is constituted of a display circuit 6a and a light-emitting element 6b, and is electrically connected with the amplifier circuit board 5 through a fifth wire 28. The display circuit 6a is a circuit which controls the light-emitting element 6b. For example, the display circuit 6a controls the light-emitting element 6b such that it emits light when power is supplied from the external device through the external wire 19. In addition, for example, the display circuit 6a controls the light-emitting element 6b such that it flickers when the zero-point adjustment signal is sent from the external device and when the amplifier circuit 5a is performing zero-point adjustment.

While in FIG. 2, the display circuit board 6 having one light-emitting element 6b is shown, the present invention may have another aspect in this respect. For example, multiple light-emitting elements may be provided on the display circuit board 6, and a numeral value indicating the pressure signal according to the amplified signal may be displayed by controlling a light-emitting state of these elements. Thus, a function of displaying the pressure detected by the pressure-detecting element 3 can be included in the pressure sensor 1 itself.

The housing cover 2a is mounted to the housing body 2b, and the housing cover 2a and the housing body 2b are fitted together to form the second space R2. The housing cover 2a includes an inflow port 7 for letting the cooling gas for cooling the amplifier circuit board 5 flow into the second space R2, and the discharge port 8 for discharging the cooling gas from the second space R2.

The inflow port 7 and the discharge port 8 are connected to an external cooling gas supply source (not shown), and the cooling gas is supplied from the supply source to the inflow port 7, and the cooling gas is discharged from the discharge port 8. Although various gases are usable as the cooling gas, air is used in the present embodiment.

As shown in FIG. 2, the outer circumferential surface of the amplifier circuit board 5 and the inner circumferential surface of the housing cover 2a are disposed at a certain interval without contacting with each other. The amplifier circuit board 5 is disposed between the inflow port 7 and the discharge port 8. Thus, the cooling gas (air) flowing in from the inflow port 7 cools a lower surface of the amplifier circuit board 5 and passes between the amplifier circuit board 5 and the housing cover 2a to cool the upper surface of the amplifier circuit board 5, and thereafter is discharged from the discharge port 8.

The shapes of openings of the inflow port 7 and the discharge port 8 to the second space is circular. An opening diameter of the discharge port 8 to the second space R2 is larger than an opening diameter of the inflow port 7 to the second space R2. Thus, while the flow of the cooling gas from the inflow port 7 into the second space R2 is restricted, discharge of the cooling gas from the second space R2 to the discharge port 8 is facilitated. This prevents the pressure in the second space R2 from rising due to inflow of the cooling gas.

A coupling part 22 is a member which is provided in the housing body 2b, and to which the external wire 19 for transmitting the amplified signal to the external device is coupled. A female connector is provided at an end of the coupling part 22, while a male connector is provided at an end of a connecting part 21 of the external wire 19. Connecting the female connector and the male connector brings the fourth wire 27 and the external wire 19 into an electrically connected state.

Coupling the coupling part 22 of the housing body 2b and the connection part 21 at an end of the external wire 19 connected to the external device brings an O-ring provided in the coupling part 22 into contact with the inner surface of the connection part 21. Thus, the first space R1 of the housing 2 is separated from the space near the pressure sensor 1.

Figure 6:
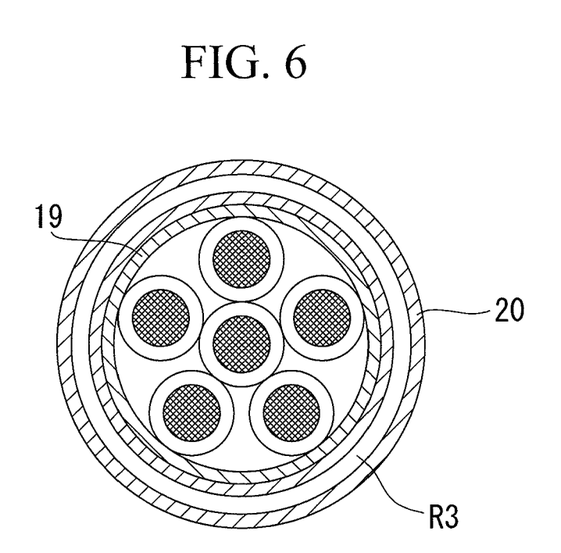
FIG. 6 is a cross-sectional view of an external wire and a cladding film.

As shown in the cross-sectional view of FIG. 6, the external wire 19 is clad with the cladding film 20 (cladding part), and the third space R3 is provided between the external wire 19 and the cladding film 20. In FIG. 6, the external wire 19 and the cladding film 20 are shown in a state where they are not in contact with each other over the entire circumference in the circumferential direction. However, the external wire 19 and the cladding film 20 are not in this state over the entire length of the external wire 19. The external wire 19 and the cladding film 20 are in contact with each other in some portions, and not in contact in other portions.

The third space R3 between the external wire 19 and the cladding film 20 communicates with the space near the external device, and also communicates with the first space R1 inside the housing 2 through the coupling part 22. Thus, the first space R1 communicates with the space near the external device through the third space R3, and the gas in the space near the external device is supplied to the first space R1.

While various materials are usable as the material of the cladding film 20, for example, a fluorine resin such as Teflon (registered trademark) can be used. In addition, while various lengths of the external wire 19 are usable, the length can be, for example, about 2 m.

Next, a support member 14 which supports the second passage 16 will be described.

As shown in FIG. 3, a diameter D4 of the outer circumferential surface of the second passage 16 is smaller than a diameter D3 of the outer circumferential surface of the first passage 15. As described above, the passage length L2 of the second passage 16 is longer than the passage length L1 of the first passage 15. Thus, when the housing 2 is disposed so that the first passage 15 and the second passage 16 are positioned at a lower side in the vertical direction as shown in FIG. 3, load of an upper part of the housing 2 is concentrated on the second passage 16, which may deform the second passage 16. Furthermore, when a rotary force (torsion force) is applied to the first passage 15 of the housing 2 through the cap nut 17, the second passage 16 may be deformed.

In order to prevent such deformation of the second passage 16, the support member 14 is disposed so as to surround the second passage 16 over its passage length L2. The support member 14 is a member independent of the housing 2, and is a member disposed in a state of being fitted to the housing body 2b. As shown in FIG. 1, the support member 14 has an opening on one part of its outer circumferential surface, allowing the support member 14 to communicate with the external space.

FIG. 4(a) is a transverse cross-sectional view of the pressure sensor 1 shown in FIG. 2 along the line C-C. As shown in FIG. 4(a), a shape of the inner circumferential surface of the support member 14 substantially matches a shape of the outer circumferential surface of the housing body 2b, and the support member 14 and the housing body 2b are in a fitted state. The shape of the inner circumferential surface of the support member 14 and the shape of the outer circumferential surface of the housing body 2b are circular except for two end surfaces at upper and lower positions. When a rotary force (torsion force) centering on a central axis of the second passage 16 is applied to the support member 14 in the circumferential direction, the force applied to the support member 14 is transmitted to the housing body 2b due to the presence of the two end surfaces at the upper and lower positions.

FIG. 4(b) is a transverse cross-sectional view of the pressure sensor 1 shown in FIG. 2 along the line D-D. As shown in FIG. 4(b), a part of the inner circumferential surface of the support member 14 and a part of the outer circumferential surface of the housing body 2b are in contact with each other at four positions, and the support member 14 and the housing body 2b are in a fitted state. When a rotary force (torsion force) centering on the central axis of the second passage 16 is applied to the housing body 2b in the circumferential direction, the force applied to the housing body 2b is transmitted to the support member 14 due to the contact between the inner circumferential surface of the support member 14 and the outer circumferential surface of the housing body 2b at the four positions.

When a rotary force (torsion force) centering on a central axis of the first passage 15 is applied through the cap nut 17 to the first passage 15 of the housing body 2b in the circumferential direction, the force applied is transmitted as follows: First, due to the structure shown in FIG. 4(b), the force applied to the housing body 2b is transmitted to the support member 14. Then, due to the structure shown in FIG. 4(a), the force applied to the support member 14 is transmitted to the housing body 2b.

That is, the force applied through the cap nut 17 is applied not intensively on the second passage 16 of the housing body 2b alone, but is applied also to the upper part of the housing body 2b through the support member 14. Thus, the support member 14 can properly support the second passage 16 so as to prevent the second passage 16 from deforming.

As has been described above, in the amplifier-embedded pressure sensor 1 of the present embodiment, the space inside the housing 2, to which the pressure-detecting element 3 is fixed, is separated by the separation member 4 into the first space R1 where the pressure-detecting element 3 is disposed, and the second space R2 where the amplifier circuit board 5 having the amplifier circuit 5a for amplifying the pressure signal detected by the pressure-detecting element 3 is disposed.

Furthermore, the amplifier circuit board 5 is cooled by the cooling gas flowing from the inflow port 7 into the second space R2 of the housing 2, and the cooling gas is discharged from the discharge port 8 to the outside of the housing 2. Although inflow of the cooling gas causes pressure fluctuations in the second space R2 inside the housing 2, no pressure fluctuation occurs in the first space R1, as the first space R1 is separated from the second space R2 by the separation member 4.

Therefore, the pressure fluctuation in the second space R2 does not affect the detection results of the pressure-detecting element 3 which detects the differential pressure between the fluid to be detected and the space where the pipe is installed. Thus, according to the present embodiment, it is possible to provide the amplifier-embedded pressure sensor 1 which, when detecting the differential pressure between the high-temperature fluid and the space where the pipe is installed, can properly detect the differential pressure between the fluid and the space where the pipe is installed, while protecting the amplifier circuit 5a for pressure signals from heat of the fluid.

According to the amplifier-embedded pressure sensor 1 of the present embodiment, the amplifier circuit board 5 is disposed between the inflow port 7 and the discharge port 8. This allows the cooling gas to flow near both front and back surfaces of the amplifier circuit board 5, so that the amplifier circuit 5a is adequately cooled.

According to the amplifier-embedded pressure sensor 1 of the present embodiment, the space between the inner circumferential surface of the housing 2 and the outer circumferential surface of the separation board 4a, whose shape substantially matches the shape of the inner circumferential surface of the housing 2, is filled with the filling material 4b, so that the cooling gas is prevented from flowing from the second space R2 into the first space R1.

This allows the space inside the housing 2 to be separated into the first space R1 where the pressure-detecting element 3 is disposed and the second space R2 where the amplifier circuit board 5 is disposed, by a relatively simple work of packing the filling material 4b between the outer circumferential surface of the separation board 4a and the inner circumferential surface of the housing 2.

According to the amplifier-embedded pressure sensor 1 of the present embodiment, the amplifier-embedded pressure sensor may include the coupling part 22 to which the external wire 19 for transmitting the pressure signal amplified by the amplifier circuit 5a to the external device is coupled, and the first space R1 may communicate with the space near the external device through the third space R3 between the external wire 19 and the cladding film 20 cladding the external wire 19.

This allows the gas in the space near the external device, which is disposed at a position separated from the pressure sensor 1 by the length of the external wire 19, to be supplied to the first space R1 through the third space R3. Thus, corrosion of the pressure-detecting element 3 in the first space R1 can be prevented, as the space near the pressure sensor 1 may corrode the pressure-detecting element 3 in the first space R1 due to effects of the fluid, etc. whose pressure is to be detected.

According to the amplifier-embedded pressure sensor 1 of the present embodiment, the fluid chamber 23 is formed by the pressure-receiving surface 3a of the pressure-detecting element 3 and the surface of the housing 2 opposite to the pressure-receiving surface 3a, and the housing 2 includes the first passage 15 which communicates with the external passage and the second passage 16 which communicates the first passage 15 and the fluid chamber 23, and the passage diameter D2 of the second passage 16 is smaller than the passage diameter D1 of the first passage 15.

This allows the temperature of the fluid reaching the fluid chamber 23 to be kept low by sufficiently cooling the high-temperature fluid flowing in from the first passage 15 in the second passage 16, which has higher cooling efficiency than the first passage 15, before the fluid reaches the fluid chamber 23.

According to the amplifier-embedded pressure sensor 1 of the present embodiment, the passage length L2 of the second passage 16 is longer than the passage length L1 of the first passage 15. This allows the cooling efficiency of the second passage 16 to be further enhanced, so that the temperature of the fluid reaching the fluid chamber 23 can be kept sufficiently low.

According to the amplifier-embedded pressure sensor 1 of the present embodiment, the diameter D4 of the outer circumferential surface of the second passage 16 may be smaller than the diameter D3 of the outer circumferential surface of the first passage 15, and the support member 14 may be provided which is disposed so as to surround the second passage 16 over its passage length L2, and supports the second passage 16 in a state where the space close to the outer circumferential surface of the second passage 16 communicates with the external space.

This allows the effects of the load on the second passage 16 having a smaller passage diameter to be properly supported by the support member 14, so that deformation of the second passage 16 can be adequately prevented.

According to the amplifier-embedded pressure sensor 1 of the present embodiment, the opening diameter of the discharge port 8 to the second space R2 is larger than the opening diameter of the inflow port 7 to the second space R2. This allows the cooling gas flowing from the inflow port 7 into the second space R2 of the housing 2 to be easily discharged from the discharge port 8, so that a failure due to high pressure in the second space R2 can be prevented.

According to the amplifier-embedded pressure sensor 1 of the present embodiment, the amplifier-embedded pressure sensor includes: the first wire 24 for transmitting the pressure signal from the pressure-detecting element 3 to the separation member 4; the second wire 25 for transmitting the pressure signal from the separation member 4 to the amplifier circuit board 5; and the third wire 26 for transmitting the pressure signal amplified by the amplifier circuit 5a from the amplifier circuit board 5 to the separation member 4.

The separation member 4 includes the first terminal 4c, to which the first wire 24 is connected, on the first space R1 side surface, and the second terminal 4d, to which the second wire 25 is connected, on the second space R2 side surface, and the first terminal 4c and the second terminal 4d are electrically connected with each other.

This allows transmission of the pressure signal from the pressure-detecting element 3 to the amplifier circuit 5a and transmission of the amplified pressure signal from the amplifier circuit 5a to the separation member 4 while separating the first space R1 and the second space R2 by the separation member 4.

Other Embodiments

Although in the first embodiment, the first terminal 4c and the second terminal 4d provided on the separation board 4a are formed using through-holes, the present invention may have another aspect in this respect. As long as the first terminal 4c and the second terminal 4d are electrically connected with each other, for example, these terminals may be metal contacts provided on the surface of the separation board 4a.

Although in the first embodiment, the display circuit board 6 is provided, the display circuit board 6 may be omitted. Alternatively, a circuit board having other functions may be provided in place of the display circuit board 6. Furthermore, a circuit board having other functions may be provided in addition to the display circuit board 6.

In other respects, the present invention is not limited to the above-described embodiments, but changes can be appropriately made without departing from the scope of the present invention.

The invention claimed is:
1. An amplifier-embedded pressure sensor, which is connected to a pipe including a fluid passage, comprising:
   a pressure detector which has a pressure-receiving surface in contact with a fluid flowing in from the pipe, and which detects a differential pressure between the fluid in contact with the pressure-receiving surface and a space where the pipe is installed and outputs a pressure signal;
   an amplifier circuit board which has an amplifier circuit for amplifying the pressure signal detected by the pressure detector;
   a housing to which the pressure detector is fixed; and
   a separator which is fixed to the housing and separates a space inside the housing into a first space where the pressure detector is disposed and a second space where the amplifier circuit board is disposed, wherein
   the housing includes an inflow port for letting cooling gas for cooling the amplifier circuit board flow into the second space and a discharge port for discharging the cooling gas from the second space, and
   wherein the amplifier circuit board is disposed between the inflow port and the discharge port so that the cooling gas flowing in from the inflow port cools one side of the amplifier circuit board and passes between the amplifier circuit board and the housing to cool the other side of the amplifier circuit board, and thereafter is discharged from the discharge port.

2. The amplifier-embedded pressure sensor according to claim 1, wherein a fluid chamber is formed by the pressure-receiving surface of the pressure detector and a surface of the housing opposite to the pressure-receiving surface, the housing includes a first passage which communicates with an external passage and a second passage which connects the first passage and the fluid chamber, and a passage diameter of the second passage is smaller than a passage diameter of the first passage.

3. The amplifier-embedded pressure sensor according to claim 2, wherein a passage length of the second passage is longer than a passage length of the first passage.

4. The amplifier-embedded pressure sensor according to claim 1, wherein the separation part separator includes a separation board having an outer circumferential surface of a shape substantially matching a shape of an inner circumferential surface of the housing, and a filling material which is packed between the outer circumferential surface of the separation board and the inner circumferential surface of the housing so as not to allow the cooling gas to flow through.

5. The amplifier-embedded pressure sensor according to claim 1, wherein an opening diameter of the discharge port to the second space is larger than an opening diameter of the inflow port to the second space.

6. An amplifier-embedded pressure sensor, which is connected to a pipe including a fluid passage, comprising:

a pressure detector which has a pressure-receiving surface in contact with a fluid flowing in from the pipe, and which detects a differential pressure between the fluid in contact with the pressure-receiving surface and a space where the pipe is installed and outputs a pressure signal;

an amplifier circuit board which has an amplifier circuit for amplifying the pressure signal detected by the pressure detector;

a housing to which the pressure detector is fixed; and a separator which is fixed to the housing and separates a space inside the housing a first space where the pressure detector is disposed and a second space where the amplifier circuit board is disposed; and a coupler to which an external wire for transmitting the pressure signal amplified by the amplifier circuit to an external device is coupled, wherein:

the housing includes an inflow port for letting cooling gas for cooling the amplifier circuit board flow into the second space and a discharge port for discharging the cooling gas from the second space, and the first space communicates with a space near the external device through a third space between the external wire and cladding that clads the external wire.

7. An amplifier-embedded pressure sensor, which is connected to a pipe including a fluid passage, comprising:

a pressure detector which has a pressure-receiving surface in contact with a fluid flowing in from the pipe, and which detects a differential pressure between the fluid in contact with the pressure-receiving surface and a space where the pipe is installed and outputs a pressure signal;

an amplifier circuit board which has an amplifier circuit for amplifying the pressure signal detected by the pressure detector;

a housing to which the pressure detector is fixed; and a separator which is fixed to the housing and separates a space inside the housing into a first space where the pressure detector is disposed and a second space where the amplifier circuit board is disposed, wherein:

the housing includes an inflow port for letting cooling gas for cooling the amplifier circuit board flow into the second space and a discharge port for discharging the cooling gas from the second space, a fluid chamber is formed by the pressure-receiving surface of the pressure detector and a surface of the housing opposite to the pressure-receiving surface, the housing includes a first passage which communicates with an external passage and a second passage which connects the first passage and the fluid chamber, a passage diameter of the second passage is smaller than a passage diameter of the first passage, a diameter of the outer circumferential surface of the second passage is smaller than a diameter of the outer circumferential surface of the first passage, and a support is provided which is disposed so as to surround the second passage over its passage length, and supports the second passage in a state where the space close to the outer circumferential surface of the second passage communicates with the external space.

8. An amplifier-embedded pressure sensor, which is connected to a pipe including a fluid passage, comprising:

a pressure detector which has a pressure-receiving surface in contact with a fluid flowing in from the pipe, and which detects a differential pressure between the fluid in contact with the pressure-receiving surface and a space where the pipe is installed and outputs a pressure signal;

an amplifier circuit board which has an amplifier circuit for amplifying the pressure signal detected by the pressure detector;

a housing to which the pressure detector is fixed; and a separator which is fixed to the housing and separates a space inside the housing into a first space where the pressure detector is disposed and a second space where the amplifier circuit board is disposed;

a first wire which transmits the pressure signal from the pressure detector to the separator;

a second wire which transmits the pressure signal from the separator to the amplifier circuit board; and a third wire which transmits the pressure signal amplified by the amplifier circuit from the amplifier circuit board to the separator, wherein:

the housing includes an inflow port for letting cooling gas for cooling the amplifier circuit board flow into the second space and a discharge port for discharging the cooling gas from the second space, the separator includes a first terminal, to which the first wire is connected, on a first space-side surface thereof, and a second terminal, to which the second wire is connected, on a second space-side surface thereof, and the first terminal and the second terminal are electrically connected with each other.

\* \* \* \* \*